United States Patent [19]

Hung et al.

[11] Patent Number: 4,744,888
[45] Date of Patent: May 17, 1988

[54] PROCESS FOR THE REMOVAL OF SODIUM FROM A HYDROCARBON FEEDSTOCK EMPLOYING A CATALYST SYSTEM

[75] Inventors: Chi-Wen Hung, San Rafael; Bruce E. Reynolds, Martinez, both of Calif.

[73] Assignee: Chevron Research Company, San Francisco, Calif.

[21] Appl. No.: 915,457

[22] Filed: Oct. 6, 1986

[51] Int. Cl.$^4$ .................... C10G 45/04; C10G 29/04
[52] U.S. Cl. .................... 208/251 H; 208/216 PP; 208/297; 208/299; 208/300; 208/303; 208/251 R
[58] Field of Search ............. 208/251 H, 216 PP, 297, 208/299

[56] References Cited

U.S. PATENT DOCUMENTS

| | | | |
|---|---|---|---|
| 3,785,967 | 1/1974 | van Klinken | 208/216 PP |
| 3,830,728 | 8/1974 | Mounce | 208/216 PP |
| 3,898,155 | 8/1975 | Wilson | 208/216 PP |
| 4,066,574 | 1/1978 | Tamm | 208/216 PP |
| 4,069,139 | 1/1978 | Riley et al. | 208/216 PP |
| 4,225,421 | 9/1980 | Hensley, Jr. et al. | 208/251 H |
| 4,395,328 | 7/1983 | Hensley, Jr. et al. | 208/251 H |
| 4,404,097 | 9/1983 | Angevine et al. | 208/251 H |
| 4,411,824 | 10/1983 | Chen | 208/251 H |
| 4,454,026 | 6/1984 | Hensley, Jr. et al. | 208/216 PP |
| 4,534,852 | 8/1985 | Washecheet al. | 208/251 H |
| 4,549,957 | 10/1985 | Hensley, Jr. et al. | 208/251 H |
| 4,587,012 | 5/1986 | Quann | 208/216 PP |
| 4,588,709 | 5/1986 | Morales et al. | 208/251 H |

*Primary Examiner*—Helen M. S. Sneed
*Assistant Examiner*—Helane Myers
*Attorney, Agent, or Firm*—S. R. La Paglia; T. G. DeJonghe

[57] ABSTRACT

We disclose a catalyst system which is capable of removing sodium from a hydrocarbon feed having at least 1 ppm oil-soluble sodium. It comprises a catalyst layer characterized as a fixed bed of catalyst particles having a low volume percent of their pore volume percent in the form of macropores above 1000 Å in diameter, high surface area, and high hydrogenation activity. We also disclose a process of using the system.

5 Claims, No Drawings

1

PROCESS FOR THE REMOVAL OF SODIUM FROM A HYDROCARBON FEEDSTOCK EMPLOYING A CATALYST SYSTEM

BACKGROUND OF THE INVENTION

The present invention relates to a catalyst system capable of removing sodium from a hydrocarbon feedstock and a process using this system. It is in general terms a fixed bed catalyst system. More particularly, it comprises a layer of catalyst particles characterized as having a low volume percent of their pore volume in the form of macropores, having a high surface area, and having a high hydrogenation activity. The process which uses this catalyst system comprises passing a sodium-containing hydrocarbon feedstock over the catalyst system at hydrodemetalation conditions.

Most heavy crudes contain significant amounts of organic metal compounds such as nickel and vanadium. Some are present as insoluble salts which can be removed by conventional filtrating and desalting processes. Yet most of them are present as oil-soluble compounds which are not removed and continue on to the catalyst bed. They create problems for refiners by depositing just below the external surface of the catalyst particles. As a result, they block the catalyst pore openings and deactivate the catalyst.

Previous workers in the field have suggested a variety of schemes to remove the oil-soluble nickel and vanadium organometallics from petroleum feedstocks. One approach is frequently to replace the fouled catalyst, but this is wasteful and results in costly under-utilization of the catalyst. In recent years, workers in the field have developed hydrodemetalation (HDM) catalysts to protect the more active hydrodesulfurization, hydrodenitrification, or hydrocracking catalysts. Generally, the HDM catalyst contacts the contaminated feed and the metals are deposited before the feed continues through the catalyst bed contacting the active catalysts. In particular, complicated schemes of grading varieties of catalysts which differ in pore size, support composition, and metals loading can result in more efficient use of the individual catalysts.

Most grading schemes involve contacting the hydrocarbon feedstock with a catalyst having large pores designed for metals capacity followed by catalysts with smaller pores and more catalytic metals to remove sulfur and other organic metals. In this way the contaminated feed initially contacts a less active catalyst, thereby allowing the feed to penetrate the catalyst more fully before metal deposition occurs. As the less contaminated feed continues through the catalyst bed, it contacts more active catalysts which promote the deposition of sulfur and other organic metals. Thus, for any given feedstock containing metals that penetrate to the interior of the catalyst, such as nickel and vanadium, there will be an ideal grading of catalyst which will result in the the most efficient use of these catalysts from the top of the reactor to the bottom.

Conventional processes, which remove nickel, vanadium, and iron, generally have decreasing macroporosity and increasing mesoporosity in the direction of feed flow through the graded bed. The term "macropore" is used in the art and is used herein to mean catalyst pores or channels or openings in the catalyst particles greater than about 1000 Å in diameter. Such pores are generally irregular in shape and pore diameters are used to give only an approximation of the size of the pore openings. The term "mesopore" is used in the art and used herein to mean pores having an opening of less than 1000 Å in diameter. Mesopores are, however, usually within the range of 40–400 Å in diameter.

Previous workers have found macroporosity to be strongly related to the capacity of catalyst particles to retain metals removed from a hydrocarbon feed contaminated with nickel, vanadium, and iron. In the later catalyst zones, they prefer predominantly mesoporous catalysts. They found these catalysts to have substantially higher catalytic activity for hydrogenation compared to catalysts having lower surface areas and substantially a macroporous structure. Thus, they exploited these two phenomena to remove nickel, vanadium, and iron from heavy feedstocks in graded catalyst systems.

We encounter a more difficult problem when sodium is present in the hydrocarbon feedstock. Sodium typically exists as a metal oxide, sulfide, or chloride appearing as a sodium salt. But it can also be present as an oil-soluble organometallic compound, including metal naphthenates. The present invention particularly addresses this complex metal contaminant problem.

We can easily identify and remove oil-insoluble sodium salts by conventional desalting and filtering techniques. But we know the soluble sodium compounds with less certainty. They are difficult to trace and cannot be removed by conventional methods. Moreover, catalyst systems, like those described above, which are effective for the removal of nickel and vanadium are impotent in controlling the deleterious effects of sodium deposition.

Organic sodium compounds deeply penetrate the catalyst particles working to block the active sites within the catalyst and rendering it deactivated. As a result of our work it has become clear that we cannot use conventional graded systems successfully to remove sodium from hydrocarbon feedstocks. Thus, it is necessary for us to devise a catalyst system, taking into consideration such factors as porosity and hydrogenation activity of the catalyst particles, that successfully removes sodium from hydrocarbon feedstocks. Accordingly, it is an object of this invention to provide such a catalyst system.

SUMMARY OF THE INVENTION

This invention concerns a catalyst system, capable of removing sodium from a hydrocarbon feed having at least 1 ppm oil-soluble sodium. The system comprises a catalyst layer characterized as a fixed bed of catalyst particles having a low volume percent of their pore volume in the form of macropores above 1000 Å in diameter, low surface area and high hydrogenation activity.

Also, in accordance with this invention, we disclose a process for hydrodemetalating a hydrocarbon feedstock comprising sodium compounds. The process comprises passing the feedstock, in the presence of hydrogen, through the system at hydrodemetalating conditions.

DETAILED DESCRIPTION OF THE INVENTION

According to the present invention, we contact a sodium-containing hydrocarbon feedstock under hydrodemetalating conditions with a catalyst system. The system comprises a layer of catalyst particles characterized as having a low volume percent of their pore volume in the form of macropores, having a high surface area, and having high hydrogenation activity.

Feedstocks

The feedstocks of this invention can be any hydrocarbonaceous feedstocks that contain sodium dissolved therein. Significant amounts of nickel, vanadium, and iron are usually present too. They will be those feedstocks having more than 1 ppm, preferably more than 3 ppm, of oil-soluble sodium. They will typically contain more than 20 ppm of other metals such as nickel, vanadium, and iron. In addition, they generally contain more than 1.0 wt % sulfur and frequently more than 2.0 wt %. The feedstocks suitable for this invention can be crudes, topped crudes, atmospheric or vacuum residua, vacuum gas oil, and liquids from synthetic feed processes, such as liquids from coal, tar sands, or oil shale. For example, we tested vacuum residua from a double desalted Shengli No. 2 crude oil obtained from the People's Republic of China which comprises about 10 ppm of sodium, and about 90 ppm of other heavy metals.

Catalysts

For particular levels of sodium present in the feedstock, we must carefully select parameters such as porosity and surface activity of the catalyst particles to obtain the desired sodium removal.

We determine the pore size distribution within the catalyst particle by mercury porosimetry. The mercury intrusion technique is based on the principle that the smaller a given pore the greater will be the mercury pressure required to force mercury into that pore. Thus, if we expose an evacuated sample to mercury and apply pressure incrementally with the reading of the mercury volume disappearance at each increment, we can determine the pore size distribution. The relationship between the pressure and the smallest pore through which mercury will pass at the pressure is given by the equation:

$$r = -2\sigma \cos \theta / P$$

where
 $r$ = the pore radius
 $\sigma$ = surface tension
 $\theta$ = contact angle
 $P$ = pressure Using pressures up to 60,000 psig and a contact angle of 140°, the range of pore diameters encompassed is 35–10,000 Å.

We characterize the catalysts for this invention as having a pore volume distribution of less than 30%, preferably less than 20%, and most preferably less than 10% of its pore volume present in pores having diameters larger than 1000 Å; an average mesopore diameter ranging from about 80 Å to about 400 Å, preferably from about 100 Å to about 300 Å, and most preferably from about 180 Å to about 250 Å; and a surface area ranging from about 80 m²/g to about 300 m²/g, preferably about 100 m²/g to about 200 m²/g, and most preferably from about 100 m²/g to about 120 m²/g.

In addition, we can vary the type and amount of catalytic metals loaded onto given catalyst supports. Catalytic metals can be Group VIB or Group VIII metals from the Periodic Table according to the 1970 Rules of the International Union of Pure & Applied Chemistry. In particular, we prefer cobalt and nickel as Group VIII metals, and molybdenum and tungsten as Group VIB metals. We use them singly or in combination, for example, cobalt-molybdenum, cobalt-tungsten, or nickel-molybdenum.

We characterize the catalysts as having at least 0.7 wt %, preferably at least 1.0 wt % and most preferably at least 1.3 wt % of a Group VIII metal; and at least 3.0 wt %, preferably at least 4.0 wt %, and most preferably at least 6.0 wt % of a Group VIB metal.

Preparation of Catalysts

We employed alumina supports in preparing the catalysts of this invention. For example, suitable supports for these catalysts are detailed in U.S. Pat. No. 4,113,661 to Tamm, issued Sept. 12, 1978, which is incorporated by reference.

Thereafter, the catalytic agents required for these catalysts may be incorporated into the alumina support by any suitable method, particularly by impregnation procedures ordinarily employed in the catalyst preparation art. Group VIB, especially molybdenum and tungsten, and Group VIII, especially cobalt and nickel, are satisfactory catalytic agents for the present invention.

Hydrodemetalating Conditions

In general, hydrodemetalation conditions include temperatures in the range of about 500° F. to about 900° F., preferably about 600° F. to about 800° F., most preferably about 650° F. to about 770° F.; total pressures in the range of about 1000 psig to about 3500 psig, preferably from about 1200 psig to about 3000 psig, most preferably from about 1600 psig to about 2800 psig; hydrogen partial pressures in the range of 800 psig to about 2800 psig, preferably about 1000 psig to about 2500 psig, most preferably about 1500 psig to about 2200 psig; and space velocities ranging from about 0.1 to about 3.0, preferably from about 0.3 to about 2.0, most preferably about 0.5 to about 1.7.

We exemplify the present invention below. The example is intended to illustrate a representative embodiment of the invention and results which have been obtained in laboratory analysis. Those familiar with the art will appreciate that other embodiments of the invention will provide equivalent results without departing from the essential features of the invention.

EXAMPLE

We used two catalysts in the tests described hereinafter to demonstrate alternative embodiments of the present invention. We identify them as Catalysts A and B.

Catalyst A had an average mesopore diameter of 210 Å and an average surface area of 120 m²/g. It also comprised 1.5 wt % cobalt, and 6.5 wt % molybdenum, and was in the form of 1/32 inch diameter cylinders.

Catalyst B had 25% of its pore volume in the form of macropores greater than 1000 Å in diameter and a surface area of 190 m²/g. It also comprised 0.6 wt % nickel, 1.0 wt % cobalt, and 7.5 wt % molybdenum.

We constructed two fixed catalyst beds. The first comprised 10 cc of Catalyst A, the second comprised 10 cc of Catalyst B. We then contacted each of the beds, in the presence of hydrogen, with a vacuum resid cut with a double desalted Shengli No. 2 crude oil obtained from the People's Republic of China. Using conventional techniques, we determined the feedstock's properties as summarized in Table I. We operated the beds at 1.68 LHSV, 2500 psig total pressure, 1950 psia hydrogen partial pressure, 5000 SCF/bbl, and 760° F.

TABLE 1

| Vacuum Resid Cut Used in Test | |
| --- | --- |
| LV % 538° C.+ (1000° F.+) | 81 |
| Sulfur, wt % | 2.8 |
| Nitrogen, wt % | 0.85 |
| MCRT, wt % | 16.0 |
| Hot $C_7$ Asphaltene, wt % | 5.7 |
| Viscosity, CS @ 100° C. | 1107 |
| Metals, ppm | |
| Ni | 31 |
| V | 4 |
| Fe | 22 |
| Ca | 58 |
| Na | 11 |

At these conditions, we find that both beds substantially remove all of the sodium originally present in the vacuum resid cut.

What is claimed is:

1. A process for removing oil-soluble sodium from a hydrocarbon feedstock having at least 1 ppm oil-soluble sodium, using a catalyst system, comprising:
    passing said feedstock, in the presence of hydrogen through said catalyst system at hydrodemetalating conditions, wherein said catalyst system comprises a fixed bed catalyst layer characterized by catalyst particles having
    (a) less than 30 volume percent of their pore volume in the form of macropores above 1000 Å in diameter;
    (b) an average mesopore diameter ranging from about 80 Å to about 400 Å;
    (c) a surface area ranging from about 80 $m^2/g$ to about 300 $m^2/g$;
    (d) at least 0.7 wt% of a Group VIII metal; and
    (e) at least 3.0 wt% of a Group VIB metal.

2. A process according to claim 1, wherein said catalyst particles comprise:
    (a) less than 20 volume percent of their pore volume in the form of macropores above 1000 Å in diameter;
    (b) an average mesopore diameter ranging from about 120 Å to about 300 Å;
    (c) a surface area ranging from about 100 $m^2/g$ to about 200 $m^2/g$;
    (d) at least 1.0 wt % of a Group VIII metal; and
    (e) at least 4.0 wt % of a Group VI metal.

3. A process according to claim 2, wherein said catalyst particles comprise:
    (a) less than 10 volume percent of their pore volume in the form of macropores above 1000 Å in diameter;
    (b) an average mesopore diameter ranging from about 180 Å to about 250 Å;
    (c) a surface area ranging from about 100 $m^2/g$ to about 120 $m^2/g$;
    (d) at least 1.3 wt % of a Group VIII metal; and
    (e) at least 6.0 wt % of a Group VI metal.

4. A process, according to claim 1, 2, or 3, wherein said hydrocarbon feedstock contains at least 3 ppm oil-soluble sodium.

5. A process according to claim 1 wherein said hydrodemetalating conditions comprise:
    (a) temperature ranging from about 650° F. to about 770° F.;
    (b) total pressure ranging from about 1600 psig to about 2800 psig;
    (c) hydrogen partial pressure ranging from about 1500 psig to 2200 psig; and
    (d) space velocities ranging from about 0.5 to about 1.7.

* * * * *